United States Patent [19]

Westbrook et al.

[11] 4,211,646

[45] Jul. 8, 1980

[54] WASTE WATER PROCESS

[75] Inventors: Clifton W. Westbrook, Groves; Lloyd J. Parcell, Beaumont, both of Tex.; Gary L. Claytor, Richmond, Va.; Byron V. Klock, Beaumont, Tex.

[73] Assignee: Texaco Inc., White Plains, N.Y.

[21] Appl. No.: 847,192

[22] Filed: Oct. 31, 1977

[51] Int. Cl.² .................... C02B 1/20; C02C 5/02; C02C 5/10
[52] U.S. Cl. ........................... 210/15; 210/18; 210/45; 210/48; 210/50; 210/56; 210/56; 210/53; 210/DIG. 31; 423/236; 423/367
[58] Field of Search .................... 210/2-9, 210/15, 17, 18, 42 R, 48, 50-53, 188, DIG. 31, 45, 56; 423/236, 367

[56] References Cited

U.S. PATENT DOCUMENTS

| 1,604,565 | 10/1926 | Coulier | 423/236 |
|---|---|---|---|
| 2,459,464 | 1/1949 | Smith | 210/188 |
| 2,788,259 | 4/1957 | Van Wirt et al. | 423/367 |
| 3,647,686 | 3/1972 | Gunnarsson | 210/48 |
| 3,846,293 | 11/1974 | Campbell | 210/DIG. 31 |
| 3,931,007 | 1/1976 | Sugano et al. | 210/50 |

FOREIGN PATENT DOCUMENTS

| 211928 | 12/1957 | Australia | 210/DIG. 31 |
|---|---|---|---|
| 47-03317 | 1/1972 | Japan | 210/DIG. 31 |
| 48-21667 | 3/1973 | Japan | 423/367 |

*Primary Examiner*—Charles N. Hart
*Assistant Examiner*—Peter A. Hruskoci
*Attorney, Agent, or Firm*—Robert A. Kulason; Carl G. Ries; James J. O'Loughlin

[57] ABSTRACT

A method is provided for the treatment of a waste water stream characterized by having toxic and corrosive properties due to the presence of a cyanides formates and a halide of a metal or ammonia comprising adding a ferrous ion to said waste water to convert the cyanides to iron cyanides, adding a base to said waste water until the pH of said waste water is adjusted to the range from about 9 to 11 to precipitate a sludge containing said iron cyanides, feeding said waste water to a biological reactor to convert said formates to carbon dioxide and a biological residue and recovering an environmentally upgraded waste water stream from said biological reactor.

33 Claims, No Drawings

WASTE WATER PROCESS

BACKGROUND OF THE INVENTION

The partial oxidation of distillate hydrocarbons to produce a gaseous mixture of hydrogen and carbon monoxide in the synthesis gas process is well known. According to this process, a carbonaceous gas or a distillate fuel, such as fuel oil, naphtha, methane, propane and refinery off-gases, and an oxygen-rich gas are introduced into a free-flow, non-catalytic synthesis gas generator at a temperature in the range from about 1500° to 3000° F. and a pressure in the range of about 1 to 250 atmospheres to effect the partial oxidation of the carbonaceous fuel to a synthesis gas stream comprising a mixture of hydrogen, carbon monoxide, carbon dioxide and water together with relatively minor amount of hydrogen sulfide, carbonyl sulfide, argon, nitrogen, cyanide, ammonia and methane. Water is used as a quench medium to cool the synthesis gas produced in the generator. After the separation of the synthesis gas and a major proportion of the volatile by-products gases, such as $CO_2$ and $H_2S$, from the quench water, a waste water stream remains containing small amounts of cyanides, formates and other by-products of the reaction. While this waste water stream contains toxic by-products of the synthesis gas process, it is, nevertheless, suitable as a recycle stream for the process either in admixture with the feed to the synthesis gas generator or as the quench medium to cool the hot synthesis gas mixture issuing from the gas generator. No waste water disposal problem occurs when the waste water stream can be continuously recycled in the synthesis gas process.

The reduced availability of natural gas and of petroleum gases and distillates as feedstocks materials has led to intensive efforts to develop other carbonaceous materials as fuels in the synthesis gas process. Among the carbonaceous materials under intensive investigation are petroleum residuum, petroleum coke, subbituminous, bituminous and anthracite coal, lignite, shale, organic waste material, sewage sludge, crude oil residues, coke and liquified coal and coal fractions.

When the fuel employed in a synthesis gas process contains significant amount of water-soluble salts, such as a halide of a metal or ammonia, these salts are transferred to the waste water together with the cyanides and the formates produced in the process. While the concentration levels of these impurities in the waste water remains low, the waste water or at least a portion thereof can be recycled to the synthesis gas process either to be mixed with the fuel feed to the generator or introduced into the quench zone of the generator to cool the hot gaseous product being produced. However, when the concentration levels of the impurities in the waste water are high or become high as a result of recycling, then a waste water stream must be withdrawn and disposed of. Since this waste water contain environmentally significant amounts of cyanides and formates, and at least one halide salt of a metal or ammonia, it is characterized as having both toxic and corrosive properties. The toxicity of the cyanides and the BOD of the formates are well established. The term "corrosive" as employed herein refers to the corrosive effect of the halide-containing waste water on process equipment. It is important to substantially reduce or to remove the noted components of this waste water stream before it can be disposed of.

A variety of materials or a carbonaceous nature may be employed as the feed material or fuel to a synthesis gas process as indicated above. The compositions of these materials as well as the by-products produced and the waste water stream from the process vary greatly. In certain instances, the waste water will contain metals including such metals as nickel and the transition metals chromium and vanadium, ammonia and sulfides in combination with the previously noted environmentally significant components of the waste water stream. The process of the invention is also effective for substantially reducing or removing these components of the waste water stream.

THE PRIOR ART

U.S. Pat. No. 3,725,270 discloses a pollution abatement process for waste water which involves mixing the waste water with a hydrocarbonaceous fuel and feeding this mixture to a synthesis gas generator.

U.S. Pat. No. 4,003,833 discloses a process for treating an aqueous stream containing cyanide which comprises contacting the stream with formaldehyde and a compound capable of generating $HSO_3^-$ ion at specified conditions of pH, temperature and reactant-cyanide ratios.

U.S. Pat. No. 3,904,518 discloses a method for treating waste water employing biologically active solids. The disclosure of this reference is incorporated in the disclosure of this invention.

SUMMARY OF THE INVENTION

In accordance with this process, a toxic and corrosive waste water stream, which contains environmentally significant amounts of cyanides and formates, and a halide of a metal or ammonia, is treated with ferrous ions, employing an amount of ferrous ions in moles that is in excess of the total moles of cyanides present in the waste water, while maintaining the pH of the waste water in a range from about 7 to 9 until a substantial portion of the cyanides are converted to iron cyanides. A base is added to the waste water to adjust the pH of the waste water to a range from 9 to 11 and to effect the separation of precipitation of a sludge containing the iron cyanides. The waste water is separated from the sludge and is then fed to a biological reactor which is effective to convert organic materials, such as formates, to carbon dioxide and a biological residue. The treated waste water from the biological reactor is environmentally upgraded and suitable for disposal. By pH is meant the negative logarithm of the molar hydrogen ion concentration.

SPECIFIC EMBODIMENT OF THE INVENTION

The waste water stream that can be upgraded by the novel process of the invention is characterized as a toxic and corrosive waste water stream due to the presence therein of environmentally significant amounts of cyanides and formates, and a halide of a metal or ammonia. Such as waste water stream is generated, for example, in a synthesis gas process in which the fuel feed to the gas generator is a petroleum residuum, petroleum coke, subbituminous, bituminous, or anthracite coal or liquified coal fractions, lignite, shale, organic waste material, sewer sludge, crude oil residues, coke and liquified coke or similar crude or impure carbonaceous material. While a synthesis gas process can generally be conducted at a temperature ranging from about 1500° to 3000° F., it has been found advantageous with certain of the foregoing fuels to employ a temperature in the generator ranging from about 2200° to 3000° F.

It will be understood that gaseous carbonaceous feedstocks, such as natural gas, methane, ethane or propane, or distillate carbonaceous feedstocks, such as naphtha, and butane, when employed as a fuel in the noted synthesis gas process, do not produce a waste water stream having both toxic and corrosive properties and therefore such a waste water stream does not require treatment by the special process that is described herein.

The waste water stream for which the present process is particularly intended can be described as a toxic and corrosive waste water stream containing significant amounts of cyanides, formates, and a halide of a metal or ammonia. The metal halide may be an alkali metal, alkaline earth metal or a heavy metal halide or chloride. The cyanides is such as waste water will exist in both the free and combined forms. The term "free" is used to mean the CN-ion or molecular HCN. The term "combined" is used to mean stable complex cyanide containing ions of which $Fe(CN)_6^{-4}$ is an example. The waste water intended for treatment in the prescribed process of the invention will contain total cyanides (i.e., free and combined cyanides) in a concentration ranging from about 5 ppm (parts per million) on a weight basis up to 1000 ppm or more. More commonly, the concentration range of the cyanides in the waste water will be from about 10 to 100 ppm. An environmentally significant amount of cyanides is herein defined as 5 ppm or above. In general, environmental regulations prohibit the disposal in sewers and streams of a waste water containing significant amounts of cyanides.

Another major component of the waste water to be treated by the process of the invention is the formates. These compounds, which are inherently produced in a process such as the synthesis gas process, give the waste water a high biochemical oxygen demand (BOD) rendering it unsuitable or unacceptable for discharge. The waste water stream intended for treatment in the prescribed process will contain formates in a concentration ranging from about 100 to 20,000 ppm with the more common range being from about 500 to 10,000 ppm. An environmentally significant amount of formates is defined herein as 100 ppm or above.

The presence of halides in the waste water stream is responsible for the corrosive characteristics of the stream toward process equipment and limits or prevents the recycling of the stream containing cyanides and formates in order to effect the destruction of these substances in the manner disclosed in U.S. Pat. No. 3,725,270. The halides generally consist of one or more of the salts of a metal or ammonia. The predominant halide present is the chloride ion. The metal may be from a metal from Groups 1A, 2A, 5B, 6B or 8 of the Periodic Table. The bulk of the halide component of the waste water will comprise sodium, calcium, iron, nickel and ammonium halides and, more particularly, the sodium, calcium, iron, nickel and ammonium chlorides although other heavy metal halides can be present.

The waste water effluent intended for treatment by the process of this invention will generally contain from about 25 to 20,000 ppm of halides with the more common concentration range being from about 50 to 5000 ppm of halides. Still more particularly, the waste water effluent will contain from about 100 to 1000 ppm of halides, measured as sodium chloride. An amount of metal halide of 25 ppm or above is defined as corrosive to process equipment.

Certain carbonaceous materials, which are suitable for use as fuels in a partial oxidation or a synthesis gas process, will contain heavier metals which can appear in the waste water in a toxic or environmentally significant concentration. Included in this class are nickel and the transition metals vanadium and chromium. Any one or more of these metals can appear in the waste water in a concentration ranging from about 5 to 1000 ppm although more commonly at a concentration from about 10 to 250 ppm. Five ppm of any of these metals constitutes an environmentally unacceptable amount.

The waste water effluent produced when a petroleum or a coal derived fuel is employed in a partial oxidation process can also contain significant amounts of sulfides, thiocyanates (as distinct from free and combined cyanides) and carbon. These by-products of a partial oxidation reaction may each constitute from 5 to 1000 ppm or more of the waste water effluent. More commonly, the concentration of the sulfides and thiocyanates will fall in the range from about 10 to 250 ppm. Thiocyanates in this concentration is not considered environmentally significant. 5 ppm of sulfide or more constitutes an environmentally unacceptable amount.

Ammonia is inevitably produced in a partial oxidation process and a substantial portion of the ammonia will be dissolved in the waste water. The concentration of the ammonia in the waste water effluent of a synthesis gas process can range from about 100 to 10,000 ppm with the more common ammonia concentration range being from about 500 to 5000 ppm.

The ammonia may be retained in the waste water and carried into the biological reactor where it can be incorporated into a biological residue to a limited extent or metabolized by means of a suitable bacterial agent. Optionally, the ammonia can be stripped from the waste water stream after it has been separated from the sludge formed following the second chemical treatment operation. If it is desired to partially or completely strip the ammonia from the waste water, a stripping step can be employed under controlled conditions. Ammonia in an amount of 50 ppm or more is considered environmentally significant.

The conversion of formates and other organic carbonaceous material in the waste water to carbon dioxide and a biological residue is conducted in a reactor containing biologically active solids or biota according to conventional procedures. The waste water at a pH from 9 to 11 is introduced into the biological reactor and contacted with the biologically active solids at a temperature ranging from about 5° to 40° C. The wastewater in this reactor is preferably maintained under constant agitation in order to optimize the reaction. It is also desirable to monitor the composition of the waste water stream entering the biological reactor in order to insure the presence of sufficient nitrogen and phosphorus nutrients in the reactor for optimum performance. In the event of any nutrient deficiency in this reactor, nutrients can be supplied according to conventional procedures.

The waste water which issues from the biological reactor will be a substantially upgraded waste water stream due to the removal of a major amount of the toxic cyanides and of the BOD-contributing organic carbon components, such as the formates. In general, with the removal of the toxic cyanides and of the oxygen-demanding organic carbon components, the resulting waste water system is environmentally suitable for disposal in a conventional manner.

While the novel process of the invention is particularly well suited to upgrade a waste water stream which contains environmentally significant amounts of cyanides and formates, and at least one halide of a metal selected from Group 1A or 2A of the Periodic Table, the prescribed process is also effective for treating a waste water stream containing the noted contaminants in combination with one or more of the metals nickel, vanadium and chromium and/or sulfides and ammonia present in the waste water stream.

In the practice of the process of the invention, the prescribed waste water stream is first treated with ferrous ions. This treatment can be effected at any temperature ranging from about room temperature up to a temperature below the boiling point of the waste water, i.e., from about 60° to 210° F. while the pH of the waste water is maintained in the range from about 7.0 to 9.0. A portion of the ammonia stripped out as described above, can be recycled to adjust the pH acidic waste water (pH<7.0) to the necessary range. If necessary, the pH of the waste water may be adjusted to the necessary range in a conventional manner. It is preferred to effect the ferrous ion addition to the waste water at an elevated temperature ranging from about 125° to 200° F. and, more particularly, from 160° to 200° F.

The ferrous ions are supplied in the form of a ferrous salt, such as ferrous sulfate, ferrous chloride or similar ferrous compound. The amount of ferrous ions to be added, measured in moles, is an amount in excess of the total moles of cyanides present, namely the total moles of free and combined cyanides (excluding thiocyanates). Broadly, the range in moles of ferrous ions added should be from about 1.2 to 10 times the moles of cyanides. The preferred amount of ferrous ions to be added is an amount from about 2 to 6 times the moles of total cyanides. If the waste water contains other by-products which tend to compete for the ferrous ions, such as sulfides, the amount of ferrous ions added should be increased to compensate for this and thus maintain the ferrous ion to cyanides ratios described above.

The ferrous ions are added under conditions which insure that they remain as ferrous ions until they have reacted in the waste water to convert the cyanides, or a substantial portion thereof to iron cyanides. If desired, an inert atmosphere can be employed to insure maintaining the ferrous ions in the necessary reactive state. The reaction between the ferrous ions and the cyanides is quite rapid particularly if the waste water is maintained at a temperature from 180° to 200° F. which is a particularly preferred temperature range.

The waste water which has been treated with the ferrous ions is next treated with a base or a basic reacting material to adjust the pH of the treated waste water to the range from 9.0 to 11.0 and to effect the precipitation of a sludge containing the ion cyanides from the treated waste water. A variety of bases or basic reacting materials can be employed for this purpose including the oxides, hydroxides and carbonates of alkali metals and alkaline earth metals and ammonium hydroxide. The preferred bases are lime, sodium hydroxide, magnesium hydroxide and sodium carbonate. Lime or calcium oxide, which in solution becomes calcium hydroxide, is particularly preferred for this step of the process.

The lime cooperates with the ferrous ions to weigh down the sludge precipitate and is most effective for removing suspended solids. The use of lime has a surprising effect in the biological reactor. For reasons not understood, the lime enhances biological activity in the biological reactor of the present process as compared to other bases, such as sodium hydroxide.

After the sludge has formed and settled or precipitated following the addition of the base, the waste water is separated from the sludge. This waste water, which is characterized by a substantially reduced level of cyanides but containing a high level of formates and a salt or salts of a metal or metals selected from Groups 1A or 2A of the Periodic Table is suitable as a feed to a biological reactor. Thus, this waste water is introduced into a biological reactor which is effective for converting the formates in the waste water to carbon dioxide and a biological residue.

While the waste water following its separation from the sludge can be directly passed into the biological reactor, it is a preferred practice to adjust the pH of the waste water to optimize biological activity in the biological reactor. The preferred pH range for the biological reactor is from about 6 to 8 with a pH of about 7 being particularly preferred. The pH adjustment can be made according to conventional known methods. The pH employed in the biological reactor is vital or critical to this process. At low pH values below a pH of 6, the biological activity in the reactor is markedly reduced. On the other hand, at high pH values above a pH of 8, calcium carbonate will precipitate from the waste water solution and lead to plugging of the equipment. The pH adjustment, is required, can be made according to conventional known methods. In the even that an alkali metal hydroxide is used for neutralization instead of lime, there is no danger of forming a calcium carbonate precipitate and the upper pH limit is about 9.

The following example illustrates the process of the invention for a particular waste water stream.

EXAMPLE I

A waste water stream was continuously removed from the quench zone of a partial oxidation synthesis gas reaction in which a petroleum residuum was employed as the feed to a synthesis gas generator operated at a temperature of about 2400° F. and a pressure of 950 psig. The waste water withdrawn from the quench zone was characterized by having the following approximate analysis:

| | |
|---|---|
| pH | 8.5 |
| Sulfide | 20 ppm[1] |
| CN total | 20 ppm |
| CN free | 10 ppm |
| Formates | 4000 ppm |
| Total Suspended Solids | 200 ppm |
| Ammonia | 2500 ppm |
| Cl | 50 ppm |
| SCN | 20 ppm |
| Metals[2] | 100 ppm |

[1] ppm = parts per million on a weight basis.
[2] Approximately equal aounts of nickel, vanadium and iron.

The waste water was introduced into a first reaction vessel under a nitrogen atmosphere at a temperature of 180° F. with the pH of the waste water being about 8.5. A solution of ferrous sulfate and concentrated sulfuric acid was added to the waste water in the first reactor at a rate of about 0.01 pounds of ferrous sulfate (FeSO$_4$·7H$_2$O) per gallon of feed water and 0.0007 pounds of concentrated sulfuric acid per gallon of feed water. This reaction mixture was maintained at 175° F. with constant agitation and an average residence time of about 0.1 hrs. in this reaction vessel.

The treated waste water from the first reactor was directed into a second reactor while being maintained at a temperature of 175° F. Calcium hydroxide was added to the waste water at a rate of about 0.04 pounds Ca(OH)$_2$ per gallon of feed water while the reaction mixture was maintained at about 170° F. with constant agitation over a residence time of approximately 4 minutes. The treated waste water from the second reactor was passed into a clarifier to remove suspended solids from the stream in the form of a sludge.

The waste water from the clarifier now substantially free of suspended solids was passed into a stripping tower wherein a major fraction of the ammonia was removed by counter-current with steam. The water issuing from the stripper was passed into a biological reactor wherein organic matter, such as formates, was consumed or converted to carbon dioxide and a biological residue suitable for disposal. The waste water issuing from the biological reactor was substantially upgraded, being characterized by the following approximate analysis:

| | |
|---|---|
| pH | 7.5 |
| Sulfide | <1.0 ppm |
| CN total | <3.0 ppm |
| CN Free | <1.0 ppm |
| Formates | <50 ppm |
| Total suspended solids | <40 ppm |
| Ammonia | <20 ppm |
| BODs, filtered | <10 ppm |
| BODs, unfiltered | <40 ppm |
| SCN$^-$ | <1.0 ppm |
| Metals[1] | <1.0 ppm |

[1] Includes nickel, vanadium, and iron.

No detectable amounts of phenol were found in the waste water from the biological reactor.

The treated waste water was substantially upgraded by the removal of major proportions of the environmentally significant contaminants found or present in the untreated waste water. The particularly objectionable free cyanides was reduced to essentially a trace amount and the high BOD level of the formates were reduced by about 99 percent. The heavy metal contaminants and the sulfides were also removed leaving only trace levels of these components in the waste water.

We claim:

1. A method for treating a waste water stream characterized by having toxic and corrosive properties due to the presence of cyanides, formates, and a halide of a metal or ammonia which consists essentially of adding ferrous ions to said waste water, the amount of ferrous ions in moles being in excess of the total moles of cyanides present, while maintaining said waste water at a pH in the range from about 7 to 9 and at a temperature from about 125° to 200° F. to effect the conversion of a substantial portion of said cyanides to iron cyanides and form a treated waste water, adding a base to said treated waste water until a pH of said waste water is in the range from about 9 to 11 to precipitate a sludge containing said iron cyanides, separating said waste water from said sludge, feeding said waste water to a biological reactor to effect the conversion of said formates to carbon dioxide and a biological residue, and recovering an environmentally upgraded waste water from said biological reactor.

2. A method according to claim 1, in which said ferrous ions are supplied as ferrous sulfate.

3. A method according to claim 1, in which said waste water also contains ammonia and said ammonia is stripped from said waste water after said waste water has been separated from said sludge.

4. A method according to claim 1, in which said amount of ferrous ions added is from about 1.2 to 10 times the amount in moles of cyanides present.

5. A method according to claim 1, in which said ferrous ions are added to said waste water while maintaining the temperature of said waste water in the range from about 160° to 200° F.

6. A method according to claim 1, in which said ferrous ions addition is made while maintaining said waste water under an inert atmosphere.

7. A method according to claim 1, in which said waste water also contains sulfides and the amount of ferrous ions added in moles is greater than the total amount in moles of the cyanides and sulfides present.

8. A method according to claim 1, in which said base is lime.

9. A method according to claim 1, in which said base is sodium hydroxide.

10. A method according to claim 1, in which said waste water contains at least 5 parts per million of said cyanides, at least 100 parts per million of said formates, and at least 25 parts per million of said halides.

11. A method according to claim 1, in which said waste water contains at least 5 parts per million cyanides, at least 500 parts per million formates and at least 50 parts per million of said halides.

12. A method according to claim 1, in which said waste water also contains at least one metal from the group consisting of nickel, vanadium and chromium in a concentration of at least 5 parts per million.

13. A method according to claim 1, in which said waste water also contains at least 5 parts per million of sulfides.

14. A method according to claim 1, in which said waste water also contains at least 50 parts per million of ammonia.

15. A method for treating a waste water stream containing environmentally significant amounts of by-products from a process for the production of synthesis gas, said by-products including cyanides, formates, a halide of a metal or ammonia, and at least one metal from the group consisting of nickel, vanadium and chromium, said process consisting essentially of adding ferrous ions to said waste water, the amount of ferrous ion, in moles, being in substantial excess of the total moles of cyanides present while maintaining said waste water at a pH in the range from about 7 to 9 and a temperature from about 125° to 200° F. to effect the conversion of a substantial portion of said cyanides to iron cyanides and form a treated waste water, adding a base to said waste water until the pH of said waste water is in the range from about 9 to 11 to precipitate a sludge containing said iron cyanides and a substantial portion of at least one metal, separating said waste water from said sludge, feeding said waste water to a biological reactor to effect the conversion of said formates to carbon dioxide and a biological residue and recovering an environmentally upgraded waste water stream from said biological reactor.

16. A method for treating a waste water stream containing environmentally significant amounts of by-products from a process for the production of synthesis gas including at least 5 parts per million of cyanides, at least 100 parts per million of formates, and at least 25 parts per million of a halide of a metal or ammonia, said method consisting essentially of adding ferrous ions to said waste water, the amount of ferrous ions, in moles, being in excess of the total moles of cyanides present while maintaining said waste water at a pH in the range from about 7 to 9 and at a temperature from about 125° to 200° F. to effect the conversion of a substantial portion of said cyanides to iron cyanides and form a treated waste water, adding a base to said treated waste water until the pH of said waste water is in the range from about 9 to 11 to precipitate a sludge containing iron cyanides, separating said waste water from said sludge, feeding said waste water to a biological reactor to effect the conversion of said formates to carbon dioxide and a biological residue, and recovering an environmentally upgraded waste water stream from said biological reactor.

17. A method for treating a waste water stream produced in the water quench step of a process for the production of synthesis gas by reacting a carbonaceous fuel with an oxygen-rich gas in a free-flow, non-catalytic synthesis gas generator at a temperature in the range from about 1500° to 3000° F. and a pressure in the range from about 1 to 250 atmospheres, said stream being characterized by having toxic and corrosive properties due to the presence of environmentally significant amounts of cyanides, formates, and a halide of a metal or ammonia, which process consists essentially of adding ferrous ions to said waste water, the amount of ferrous ions, in moles, being in excess of the total moles of cyanides present while maintaining said waste water at a pH in the range from about 7 to 9 and at a temperature from about 125° to 200° F. to effect the conversion of a substantial portion of said cyanides to iron cyanides and form a treated waste water, adding a base to said treated waste water until the pH of said waste water is in the range from about 9 to 11 to precipitate a sludge containing iron cyanides, separating said waste water from said sludge, feeding said waste water to a biological reactor to effect the conversion of said formates to carbon dioxide and a biological residue, and recovering an environmentally upgraded waste water stream from said biological reactor.

18. A method according to claim 17, in which said ferrous ions are supplied as ferrous sulfate.

19. A method according to claim 17, in which said waste water also contains ammonia and said ammonia is stripped from said waste water after said waste water has been separated from said sludge.

20. A method according to claim 17, in which said amount of ferrous ions added is from about 1.2 to 10 times the amount in moles of the total moles of cyanides present.

21. A method according to claim 17, in which said ferrous ions are added to said waste water while maintaining the temperature of said waste water in the range from about 160° to 200° F.

22. A method according to claim 17, in which said ferrous ions addition is made while maintaining said waste water under an inert atmosphere.

23. A method according to claim 17, in which said waste water also contains sulfides and the amount of ferrous ions added in moles is greater than the total amount in moles of the cyanides and sulfides present.

24. A method according to claim 17, in which said base is lime.

25. A method according to claim 17, in which said base is sodium hydroxide.

26. A method according to claim 17, in which said waste water contains at least 5 parts per million of said cyanides, at least 100 parts per million of said formates, and at least 25 parts per million of said halides.

27. A method according to claim 17, in which said waste water contains at least 5 parts per million cyanides, at least 500 parts per million formates and at least 50 parts per million of said halides.

28. A method according to claim 17, in which said waste water also contains at least one metal from the group consisting of nickel, vanadium and chromium in a concentration of at least 5 parts per million.

29. A method according to claim 17, in which said waste water also contains at least 5 parts per million of sulfides.

30. A method according to claim 17, in which said waste water also contains at least 50 parts per million of ammonia.

31. A method according to claim 17 in which said waste water by-products include a halide of a metal selected from the class consisting of Groups 1A, 2A, 5B, 6B or 8 of the Periodic Table.

32. A method according to claim 17, in which said waste water also contains ammonia and said ammonia is stripped from said waste water after said waste water has been separated from said sludge and a portion of said ammonia is recycled to the untreated waste water to adjust the pH of said waste water to the range 7.0 to 9.0.

33. A method for treating a waste water stream containing environmentally significant amounts of by-products from a process for the production of synthesis gas including at least 5 parts per million of cyanides, at least 100 parts per million of formates, at least 25 parts per million of a halide of a metal or ammonia, and at least one metal from the group consisting of nickel, vanadium and chromium, said method consisting essentially of adding ferrous ions to said waste water, the amount of ferrous ions, in moles, being in excess of the total moles of cyanides present while maintaining said waste water at a pH in the range from about 7 to 9 and at a temperature from about 160° to 200° F. to effect the conversion of a substantial portion of said cyanides to iron cyanides and form a treated waste water, adding a base to said treated waste water until the pH of said waste water is in the range from about 9 to 11 to precipitate a sludge containing iron cyanides, separating said waste water from said sludge, feeding said waste water to a biological reactor to effect the conversion of said formates to carbon dioxide and a biological residue, and recovering an environmentally upgraded waste water stream from said biological reactor.

* * * * *